(12) United States Patent
Nath

(10) Patent No.: US 6,314,226 B1
(45) Date of Patent: Nov. 6, 2001

(54) FLEXIBLE LIGHTGUIDE WITH A LIQUID CORE

(76) Inventor: Günther Nath, Steinerstrasse 15, D-81369 Munich (DE)

( * ) Notice: Subject to any disclaimer, the term of this patent is extended or adjusted under 35 U.S.C. 154(b) by 0 days.

(21) Appl. No.: 09/423,720

(22) PCT Filed: Nov. 12, 1997

(86) PCT No.: PCT/DE97/02655

§ 371 Date: Nov. 12, 1999

§ 102(e) Date: Nov. 12, 1999

(87) PCT Pub. No.: WO98/38537

PCT Pub. Date: Sep. 3, 1998

(30) Foreign Application Priority Data

Feb. 28, 1997 (DE) ................................................ 197 08 295

(51) Int. Cl.[7] .................................................... G02B 6/02
(52) U.S. Cl. ........................... 385/125; 385/143; 385/145
(58) Field of Search ................................... 385/123, 125, 385/126, 127, 128, 141, 142, 143, 144, 145

(56) References Cited

U.S. PATENT DOCUMENTS

| 4,747,662 | * | 5/1988 | Fitz | 385/125 |
|---|---|---|---|---|
| 5,412,750 | | 5/1995 | Nath. | |
| 5,692,088 | * | 11/1997 | Ishiharada et al. | 385/125 |
| 5,898,810 | * | 4/1999 | Devens, Jr. et al. | 385/123 |

FOREIGN PATENT DOCUMENTS

| 24 06 424 | 8/1975 | (DE). |
|---|---|---|
| 40 19 363 | 8/1991 | (DE). |
| 42 33 087 | 4/1994 | (DE). |
| 197 08 295 | 9/1998 | (DE). |
| 0 246 552 | 11/1987 | (EP). |
| 0 633 257 | 1/1995 | (EP). |
| 0 656 912 | 12/1996 | (EP). |
| 94/05712 | 3/1994 | (WO). |
| 96/24625 | 8/1996 | (WO). |

* cited by examiner

*Primary Examiner*—Hemang Sanghavi
(74) *Attorney, Agent, or Firm*—Venable; Robert Kinberg

(57) ABSTRACT

The present invention provides a lightguide having a liquid core and a tubular cladding made from a plastic material, characterized in that the inner surface of the tubular cladding is coated with a layer containing the copolymer consisting of the components TFE and HFP, or TFE and PMVE wherein the weight proportion of the HFP or the perfluoroalkyl vinyl component in the copolymer may vary between 25% and 50%.

12 Claims, 1 Drawing Sheet

FLEXIBLE LIGHTGUIDE WITH A LIQUID CORE

BACKGROUND OF THE INVENTION

1. Field of the Invention

The invention relates to an improved liquid light having a liquid core and tubular cladding made from a plastic material.

2. Description of the Prior Art

A liquid lightguide is known from German Patent Application P42 330 87 comprising a cylindrical tubular cladding consisting of a carbon fluoropolymer and comprising a liquid core which is surrounded by the core and comprises an optically transparent aqueous solution. The tubular cladding is coated on its interior surface by a thin layer of a completely amorphous copolymer, the latter being based on the combination of tetrafluorethylene with a perfluorated cyclic ether. The copolymer defining said internal layer is available from Dupont de Nemours and is marketed under the trade name Teflon® AF.

Teflon® AF is soluble in certain perfluorinated liquids in amounts of several percents by weight, suitable solvents being the Fluorinert® liquids FC 75, FC 77, or FC 40 made by 3M. The deposition of the AF-layer onto the internal surface of a carbon fluoropolymer tube such as Teflon® FEP is readily achieved by wetting the internal surface of the tube with the AF containing solution and successively by evaporating the solvent by passing air therethrough or by applying reduced pressure. The thickness of the layer is only a few microns which—in the case of a Teflon® FEP tube—is sufficient for total index reflection of visible and ultraviolet radiation. The advantages of a Teflon® AF totally reflecting layer reside in its extremely low refractive index which is in the range of from 1.29 to 1.32, its absolute transparency which is comparable to fused silica glass, and its chemical inertness. Due to their photochemical stability in the ultraviolet region, aqueous salt solutions are preferred as lightguides core liquids, such as chlorides or phosphates described in DE 24 06 424 C2 and P 40 19 363.5 which have been successfully applied for more than twenty years. These liquids, such as $CaCl_2$ or $NaH_2PO_4$ dissolved in $H_2O$, should have a refractive index greater than that of the totally reflecting Teflon® AF layer; owing to the extremely low refractive index of Teflon® AF layer, liquids may be used having refractive indices of as low as n=1.36. The optical aperture angle $2\alpha$ should be at least 50°, wherein $\alpha$ may be calculated by the simple formula:

$$\sin \alpha = \sqrt{n^2_{core} - n^2_{layer}}$$

Liquid lightguides having a core liquid consisting of an aqueous phosphate solution, such as $NaH_2PO_4$ in water, and having a particularly high photochemical resistance in the UVB and UVC radiation spectral range (see P 40 14 363.5) can only be achieved by applying a totally reflecting layer having a refractive index in the range of about n=1.31, such as Teflon® AF 1600, since such solutions—due to precipitation of salt at lower temperatures—do not allow a refractive index greater than n=1.38.

A further advantage of Teflon® AF is given by its good adhesion on substrates consisting of carbon fluoropolymers, particularly after subjecting the layer to temperature baking where it is heated to temperatures slightly higher than its glass transition temperature.

A more serious draw back of Teflon® AF is its extreme high price of USD 10.00 per gram, which remarkably influences the productions costs of liquid lightguides. A further disadvantage of Teflon® AF is given by the fact that the material adheres only well on substrate materials that—as Teflon® AF itself—likewise consist of carbon fluoropolymers, and secondly that thin layers of Teflon® AF do not have elastic properties.

However this fact was acceptable in that liquid lightguides prevailing on the market during the last twenty years have been consisting of Teflon® FEP tubings filled with an aqueous $CaCl_2$ solution, so that an increase in aperture could be easily achieved by internally coating these Teflon® AF tubings with Teflon® AF without the necessity of developing new substrate-layer combinations.

However, it would be desirable if other silicon or polyurethane based tubing material could likewise be internally coated, allowing the production of new lightguides with new properties, such as enhanced flexibility. Moreover, internal coating of glass tubes would be desirable to allow for the production of light conducting optical cells.

In EP 02 46 552.B1, Fitz describes a carbon fluoropolymer practically completely amorphous and soluble in certain acetone-like liquids, recommending its use for internally coating of liquid core lightguides. This material—a terpolymer consisting of the components TFE (tetrafluoroethylene), HFP (hexafluoropropylene), and VDF (vinylidene fluoride)—is highly transparent and does not only stick on plastic substrate materials consisting of carbon fluoropolymeres; however, the material has the disadvantage of having a refractive of n=1.36 which is much higher than that of Teflon® AF and of being hardly applicable to liquid lightguides transmitting in the ultraviolet spectral range.

SUMMARY OF THE INVENTION

The present invention provides a lightguide having a liquid core and a tubular cladding made from a plastic material, characterized in that the inner surface of the tubular cladding is coded with a layer containing the copolymer consisting of the components TFE and HFP, or TFE and PMVE wherein the weight proportion of the HFP or the perfluoroalkyl vinyl component in said copolymer may vary between 25% and 50%. The layer consisting of the copolymer may have been deposited from a solution of the copolymer in a highly fluorinated cycloalkane or aromatic solvent. The thickness of the layer may be in a range of between 2 and $8\mu$.

The tubular cladding may consist of a polymer material containing fluorine. The tubular cladding may consist of one of the materials Teflon® FEP, Teflon® PTFE, Teflon® PFA, Teflon® ETFE, THV (3M), Hyflon® MFA. The tubular cladding consists of a thermoplastic or elastomeric material not containing fluorine, such as polyurethane or silicon, or of glass.

The layer, besides containing the copolymer TFE/HFP, TFE/PMVE, or TFE/PPVEj respectively, may additionally contain a perfluorated liquid having a boiling point of higher than 200° C. and a refractive index of lower than 1.31.

The perfluorated liquid may be contained in the copolymer of the layer in an amount between 0.5 and 100% by weight. The perfluorated liquid may be perfluoropolyether. The perfluoropolyether may be one of Fomblin® (Ausimont), Galden® (Ausimont), or Krytox® (DuPont), or contain a mixture of said substances.

The layer may be formed of two layers, wherein layer one contains copolymer TFE/HFP or TFE/PMVE or TFE/PPVE, and layer two contains copolymer PDD/TFE (Teflon® AF ).

The thickness of the layer may be between 1 and $10\mu$. Alternatively the thickness of the layer may be between 2 and $6\mu$.

The liquid core of the lightguide may contain an aqueous salt solution selected from the group of chlorides or phosphates, or a water miscible liquid. The liquid may contain an aqueous solution consisting of calcium chloride $CaCl_2$ dissolved in $H_2O$ or $D_2O$, $NaH_2PO_4$ dissolved in $H_2O$ or $K_2HPO_4$ dissolved in $H_2O$, or triethylene-glycol or dimethylsulfoxide admixed with $H_2O$ or $D_2O$.

DESCRIPTION OF THE PREFERRED EMBODIMENTS

Figure 1:
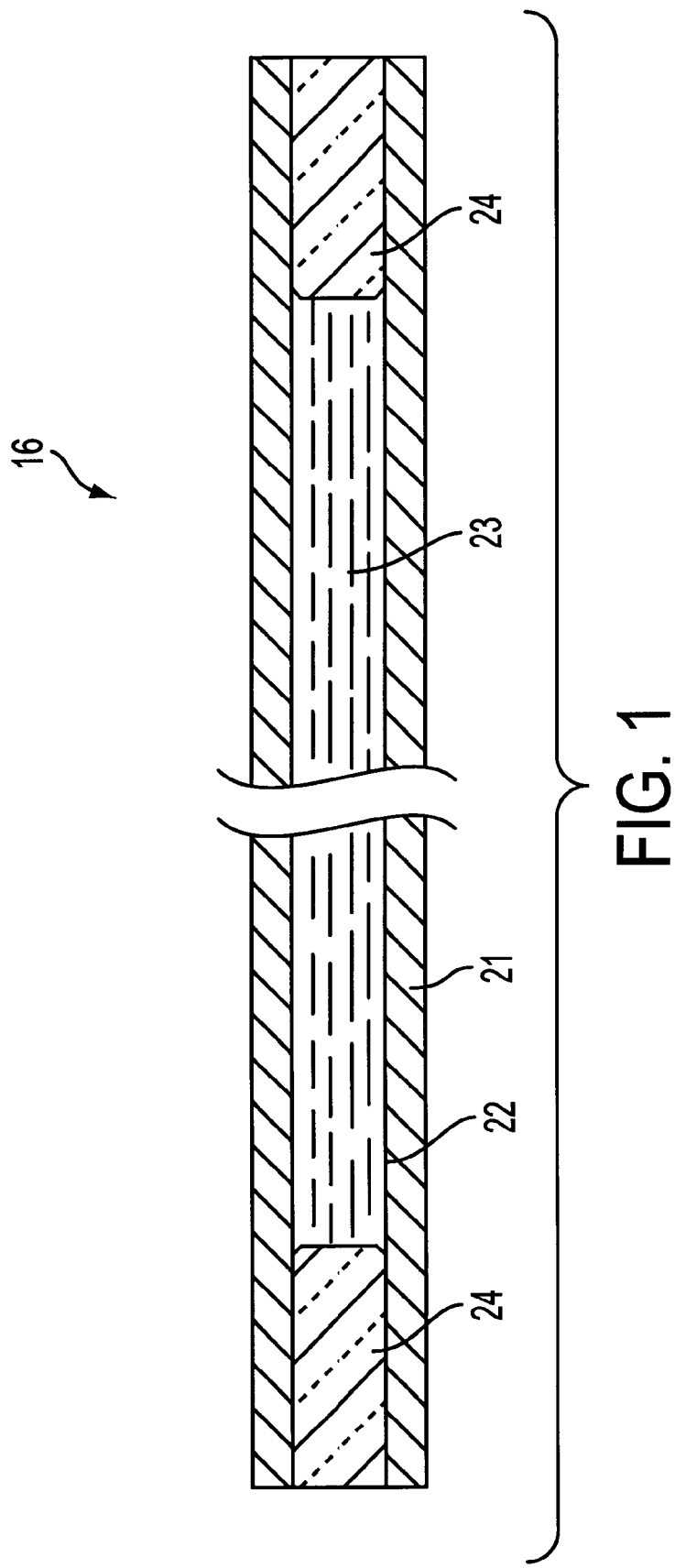
FIG. 1 shows a cross section through a liquid lightguide according to the present invention.

A coating material for use in liquid lightguides, and ideal for total reflection of ultraviolet and visible light, should have the following properties:

1) Owing to the low refractive index to be expected, which should desirably be $\leq 1.33$ (the water value), and owing to the chemical inertness to be expected against most liquids, the material should be a perfluorated polymer.
2) The material should be as transparent as possible in the ultraviolet and visible spectral ranges and should have a residual crystallinity as low possible.
3) The material should be soluble in a liquid in the range of several percent, so that it may be coated on the interior wall of the lightguide tube by simply wetting the wall at room temperature with successive evaporation of the solvent.
4) The temperature at which the material starts flowing should not be that high that the necessary baking process would exclude most of the tubing materials, and the material should possess some elasticity at room temperature so that other plastic materials such as elastomers may be coated besides carbon fluoropolymers tubings.
5) The material should well adhere on tubing made from carbon fluoropolymers important and proven for liquid lightguide, i.e. the material should have a very low surface energy in the range of 10 to 16 dyn/cm; in other words, it should be extremely hydrophobic.
6) The material should be producible in a simple and economic way, so that it does not play a role with regard to costs in the production of liquid lightguides.

German patent applications P 196 46 928.7 and P 197 08 295.5 describe coating materials alternative to Teflon® AF such as mixtures of Teflon® AF with oils consisting of perfluoropolyethers, leading likewise to highly transparent, extremely low refractive and elastic layers having excellent total reflection properties. The adhesion of these mixed layers on glass substrates is also much better as compared to layers of pure Teflon® AF.

The above mentioned German patent applications also describe a novel coating material introduced by DuPont, Teflon® SF (soluble fluoropolymer), which is soluble in perfluorated liquids such as PF 5080 ($C_8F_{16}$) from 3M and which is also excellently suited for the internal coating of liquid lightguides. High boiling (b.p.>250° C.) perfluoropolyethers may also be added to Telflon® SF, that lead to highly transparent films having a low refractive index ($n \leq 1.32$), good elasticity and adherence on a variety of substrate materials such as fluoropolymers, silicon or glass. The present invention provides internal coating of liquid lightguides with Teflon® SF, a copolymer consisting of the two monomer components. TFE and HFP (hexafluoropropylene) or TFE and a perfluoroalkyl vinyl ether.

The material as described by DuPont in EP 0 656 912 B1, a copolymer consisting of two fluoromomoners such as the TFE and HFP components and having an unusually high content of HFP in the range of from 25 to 50 percent by weight, fulfils the criteria 1) to 6) in a satisfactory way. Instead of using HFP, TFE can also be copolymerized with PMVE (perfluoromethyl vinyl ether) or PPVE (perfluoropropyl vinyl ether), wherein the content of perfluoroalkyl vinyl ether may also be in the range of from 25 to 50 percent by weight.

When composed of 92 percent by weight of TFE and as low as 8 percent by weight of HFP, the copolymer represents the well-known material Teflon® FEP which has successfully been used on the market for many years as a totally reflecting cladding material for liquid lightguides. However, the Teflon® AF FEP material still comprises some residual crystallinity which adversely affects the total reflection by light scattering, particularly in the short wavelength UV range. The same is true for Hyflon® MFA from Ausimont which consists of the TFE/PMVE copolymer with a PMVE weight percentage of only 5 to 10% In addition, the materials Teflon® AF FEP, Hyflon® MFA and Teflon® PFA, a copolymer consisting of TFE and PPVE with a content of PPVE of about 5% by weight, are not soluble in perfluorated liquids at room temperature, and therefore cannot be used for coating applications in a solution. In addition, the refractive index of Teflon® FEP with a value of n=1.34 is slightly too high, particularly in conjunction with a aqueous phosphate solution such as $NaH_2PO_4/H_2O$ as a light conducting liquid which do not allow for a refractive index to be adjusted higher than 1.38.

When drastically increasing the HFP content in the TFE/HFP copolymer in relation to the Teflon® AF FEP by a factor of 3 to 5, the residual crystallinity in relation to Teflon® AF FEP can be further strongly reduced, i.e. the material becomes more transparent and hence less light scattering; in addition, it becomes good soluble in perfluorated liquids at room temperature and atmospheric pressure, so that the convenient process of internal solution coating of tubes in solution is readily possible in analogy to the process using Teflon® AF. The same holds true for copolymers consisting of the two monomers TFE and perfluoroalkyl vinyl ether (TFE/PMVE or TFE/PPVE) with drastically increased weight portions of the perfluoroalkyl vinyl ether component, as opposed by Hyflon® MFA and Teflon® PFA. In contrast to layers made from Teflon® AF, layers made from either one of the liquid soluble polymers TFE/HFP and TFE/PMVE respectively or TFE/PPVE are elastic and show better adherence on plastic substrate materials not containing fluorine as well as on glass surfaces.

Experiments that have been conducted with this new group of perfluorated copolymers with respect of its adaptation as totally reflecting layers in liquid core lightguides have lead to the following results:

The copolymers TFE/HFP or TFE/PMVE or TFE/PPVE with a content of 25 to 50 percent by weight of HFP (PMVE, PPVE)—dissolved at ambient temperature in a perfluorated liquid such as PF 5080 from 3M or generally in highly fluorinated solvents such as highly fluorinated cycloalkanes or aromates with a concentration of about 3 to 10 percent by weight—are suited for coating of substrates made from carbon fluoropolymers, particularly of such substrates made from Teflon®. FEP.

The material shows excellent adhesion on substrates consisting of carbon fluoropolymers, particularly on such substrates made from Teflon® FEP. A layer having a thickness of a few microns (2 to 3$\mu$) can be produced by a single step wetting process of the internal surface of a tube made from Teflon® FEP with a solution containing 3% by weight of the TFE/HFP (PMVE, PPVE) copolymer. After evaporation of the solvent by a gentle air flow, a highly transparent layer of the copolymer deposited from the solution remains on the interior surface of the Teflon® FEP tubing with good adhesion to the substrate, whose adhesion can be even improved by baking the coated FEP tubing at a temperature of about 160° C., i.e. in the range of the copolymer melting temperature.

The measurement of the refractive index of a TFE/PMVE layer deposited from solution by use of an Abbé refractometer revealed a value of n=1.328. (The PMVE content of this copolymer in solution was about 40%). This value of the refractive index is only slightly below the n value of Teflon® FEP so that only an insignificant increase of the numerical aperture of a conventional liquid lightguide consisting of a tube made from Teflon® FEP filled with an aqueous solution of $CaCl_2$ may be expected. Nevertheless, there is an improvement of the liquid lightguide in so far that the TFE/PMVE layer deposited from solution shows a considerable lower residual crystallinity as compared to conventional Teflon® FEP or Hyflon® MFA or Teflon® PFA material.

The total reflection quality which involves a penetration of the reflected radiation into the optically thinner medium within a depth of a few wavelengths, as shown by Isaac Newton with his famous prism experiment, is improved due to lower scattering losses in the layer, as compared to total reflection on surfaces of Teflon® FEP. As a direct consequence, the liquid lightguide transmission is improved, even though the calculated value of the numerical aperture remains more or less unaffected. However, a small increase of the output divergence of the radiation bundle emitted by the lightguide is observed experimentally because those rays of radiation which suffer more total reflections within the lightguide and which constitute the higher divergent part of the emitted radiation bundle are less attenuated due to the better transparency of the reflecting layer. In comparison to Teflon® AF with its unique optical properties, the TFE/PMVE layer deposited from solution has the disadvantage of having a refractive index (n=1.328) higher by a few hundredths. Nevertheless, this small difference in the refractive index results in a difference of as much as 10° with respect to the lightguide optical aperture angle.

It could be shown surprisingly that the refractive index of a TFE/PMVE layer can be further reduced by adding a quantity of a high molecular and high boiling perfluoropolyether to the solution consisting of a few percent by weight of TFE/PMVE in the perfluorated liquid PF 5080 from 3M, the amount of added perfluoropolyether being substantially comparable to the amount of TFE/PMVE in the solution. Little stirring shows to lead to complete solution of the added perfluoropolyether (PFPE).

When generating a layer of this complex solution consisting of TFE/PMVE and PFPE dissolved in approximately equal amounts in the perfluorated liquid PF 5080 in the usual way by wetting a substrate surface with subsequent evaporation of the solvent, one observes that the layer is highly transparent and feels dry after baking at about 160° C. Weighing shows that the perfluoropolyether is completely incorporated within the TFE/PMVE layer. As a consequence, the thickness of the layer is about two times higher as compared to a layer not containing added PFPE. This complex layer does not only adhere excellently on substrates consisting of carbon fluoropolymers, but also on other materials such as glass, silicone, plastic rubber, or polyurethane. A measurement of the refractive index of the above described mixed layer consisting of about equal proportions of TFE/PMVE and PFPE (such as Fomblin® or Galden® from Ausimont) reveals a value of n=1.315 which value is actually comparable to that of Teflon® AF 1600.

Though the material consisting of the mixture of TFE/PMVE and PFPE is not absolutely amorphous like Teflon® AF, its optical properties are comparably good as far as total reflection, transmission and increase of optical aperture are concerned.

The great advantage of the layer of the invention, as compared to Teflon® AF which contains the expensive and technically difficult to handle PDD component consists in much lower costs and the fact that the production process of the TFE/PMVE copolymer is more simple. The costs of the PFPE oil are in the range of USD 0.10/g as compared to USD 10.0/g for Teflon® AF.

The same possibility of PFPE addition is given to solutions of the TFE/HFP copolymer in perfluorated solvents, with the consequence of corresponding refractive index reduction of the layer deposited from the solution.

Since liquid lightguides are mainly used in the ultraviolet spectral range, aqueous solutions having a refractive index not exceeding n=1.435 such as $CaCl_2/H_2O$ solutions are mostly used as a core liquid for transmission in the UVA and UVB range, or $NaH_2PO_4/H_2O$ solutions having a refractive index of n=1.38 are used for transmission in the UV range including the UVC range, i.e. down to 220 nm.

These important salt solutions are favourably contrasting with the liquid perfluoropolyether used in the mixed layer of the invention, insofar as the surface energies of the two liquids are extremely different. The surface energy of PFPE is in the range of 10 to 15 dyn/cm, whereas the surface energy of the salt solutions is in the range of 70 to 80 dyn/cm. The latter is extremely polar, whereas PFPE is extremely apolar. It is due to the phobia between the two liquids, that the PFPE oil incorporated within the reflecting TFE/HFP layer cannot be washed out by the contacting salt solution, even not within longer periods of time what would be detrimental to the transmission of the lightguides.

But also the other important liquids which are used as core liquids of liquid lightguides in the visible spectral range are in most cases polar liquids which are also hygroscopic or at least miscible with water, such as triethyleneglycol or DMSO. These liquids are by no means miscible with the PFPE oil so that also for that case no washing out of PFPE oil from the layer has to be expected.

When tubes made from FEP are internally coated with Teflon® AF in the conventional way, a layer thickness of about 3$\mu$ is already sufficient to obtain the optimum effect on transmission of ultraviolet radiation. When using other materials for the substrate tubing such as Teflon® PFA or Hyflon® MFA, Teflon® PTFE, or ETFE, a maximum UV transmission effect can only be obtained when the thickness of the Teflon® AF layer is at least 5$\mu$. The difference of these minimum thickness values of the reflecting layer can be explained by the different optical quality of the substrate materials themselves, even with regard to their capability to serve as a totally reflecting medium in liquid lightguides.

If the substrate tubing itself has a high optical quality, as it is the case with Teflon® FEP, penetration of a small fraction of the totally reflected radiation into the substrate medium does not play an important part. If the substrate medium has a low optical quality, the totally reflecting layer must have a higher thickness, so that the reflected radiation does not penetrate into the substrate medium.

In such cases, it may actually be useful to form a double layer on the substrate medium. The layer first coated internally onto the substrate tubing consists of the copolymer TFE/HFP deposited from solution as described above and has a thickness of about $3\mu$. Due to its lower residual crystallinity, this layer already has an excellent optical quality which is higher than that of to FEP. Its refractive index, being n=1.33, is also very low. After having tempered this first layer, a thin layer of Teflon® AF having a thickness of about $2\mu$ is deposited onto the first layer. While Teflon® AF cannot be completely substituted by this technique, the necessary amount of the expensive Teflon® AF is lower which allows to save costs.

In the following, the invention is explained in more detail with reference to a drawing and the examples.

FIG. 1 shows a cross section through a liquid lightguide consisting of a flexible tubing 21, a reflecting layer 22 deposited onto the inner surface of said tubing 21, the filling liquid 23 and two cylindrical quartz plugs 24 sealing both ends of said lightguide.

EXAMPLE 1

A liquid lightguide comprising a Teflon® FEP tube 21 coated on its inner surface with a thin layer 22 consisting of the copolymer TFE/HFP with the addition of a perfluoropolyether. The FEP tube 21 having an internal diameter of 5 mm and a length of 1,500 mm is internally wetted with a solution of the following composition: 3 percent by weight of the TFE/HFP copolymer dissolved in the perfluorated solvent PF 5080 from 3M having a boiling point of 101° C. with the addition of 2 percent by weight of PFPE (Fomblin or Galden HT 270 from Ausimont).

Such 3% TFE/HFP or TFE/PMVE in PF 5080 (3M) solution is made by DuPont and marketed under the trade name Teflon® SF (Soluble Fluoropolymer). The Teflon® FEP tubing 21, open on both ends and internally completely wetted with the Teflon® SF/PFPE solution, is stored vertically hanging for a period of 12 hours. Due to adhesion forces, a coherent liquid film is formed on the inner surface of the FEP tubing. After PF 5080 solvent evaporation, a uniform and highly transparent and coherent layer 22 is formed after 12 hours adhering on the interior surface of the FEP tubing and having a thickness of about $3\mu$. The tubing coated as described above is then subjected to a tempering process, first for a period of ½ hour at 110° C. for completely removing the residual PF 5080 solvent from the layer, and subsequently for a period of about ½ hour at 160° C.

The PFPE oil such as Fomblin® or Galden® from Ausimont preferably has a high boiling point of 270° C. so that no oil remains is released from the layer during tempering. However, tempering improves the adhesion of the layer to the FEP substrate, though adhesion is remarkably good even without tempering.

If the above described coating layer is generated on the prism surface of a refractometer, a refractive index of n=1.318 can be measured.

The FEP tubing 21 provided with the TFE/HFP-PFPE internal layer is then filled with the known $CaCl_2/H_2O$ solution 23 (n=1.4359), and sealed on both ends with quartz plugs 24. In this manner, a liquid lightguide is obtained having a numerical aperture corresponding to a maximum light entrance angle of 70°.

The transmission of this lightguide is also surprisingly good. At a light entrance angle of 60° and at $\lambda$=450 nm, the transmission is 82%.

Owing to the numerical aperture increase from 0.47 to 0.58 for sin α by the coating layer 22, optical losses produced by bending the lightguide are reduced to one third.

The above optical properties improvements of the lightguide are comparable with the improvements obtained by internally coating the FEP tubing with the much more high quality and expensive Teflon® AF material.

EXAMPLE 2

A liquid lightguide comprising a ⌀5×1,500 mm Hyflon® MFA tubing (Ausimont) with interior coating consisting of a TFE/PMVE layer produced from a 3% solution in FC 75 or PF 5080 from 3M, but without added PFPE oil. Layer thickness: $3\mu$.

The weight content of the PMVE component in the layer TFE/PMVE copolymer is about 40%.

By filling this coated MFA tubing with a $CaCl_2/H_2O$ solution having n=1.435, a lightguide is obtained having a transmission of 60% in the blue spectral range ($\lambda$=450 nm) as measured in the same way as described in example 1. Internal coating of the MFA tubing with a TFE/PMVE layer having a thickness of $5\mu$ leads to an optical transmission as high as 80% in the blue spectral range.

Taking into account that the above lightguide exhibits a transmission of only 25% in the blue spectral range when having a non-coated Hyflon® MFA tubing, the $3\mu$ Teflon® SF layer already considerably improves the transmission, whereas the $5\mu$ layer allows for nearly maximum values of transmission.

Adding to the 3% TFE/HFP or TFE/PMVE Teflon® SF coating solution in the perfluorated solvent PF 5080 (3M) once more the same amount of PFPE oil corresponding to amount of TFE/PMVE, such as Fomblin® or Galden® HT 270 from Ausimont, and producing with this solution an layer inside the MFA tubing having thickness of about $5\mu$ increases the transmission of the liquid lightguide made from this tubing to maximum values of above 80% in the blue spectral range.

Instead of the perfluoropolyethers Fomblin® or Galden® from Ausimont, the perfluoropolyether Krytox® from DuPont may be used. It is essential that the perfluoropolyether (PFPE) used as an additive to the Teflon® SF solution has the following properties: The PFPE should have the highest possible boiling point, possibly above 200° C., preferably above 250° C. Its refractive index should be n≦1.31. Besides perfluoropolyethers, other high boiling oils having these properties can also be used as additives to the Teflon® SF solution.

EXAMPLE 3

A liquid lightguide comprising a ⌀5×1,500 mm Teflon® FEP tubing with internal coating layer, however, this coating layer being a double layer:

The layer adjacent to the FEP substrate consists of the TFE/HFP copolymer and has a thickness of about 2 to $3\mu$. Another coating layer is deposited onto the TFE/HFP layer consisting of Teflon® AF, such as Teflon® AF 1600. Both layers are deposited from solution. The second Teflon® AF layer is only deposited after the TFE/HFP layer has been tempered at a minimum temperature of 110° C. The thickness of the second Teflon® AF layer is 1 to $2\mu$. This liquid lightguide also shows a maximum transmission value in the blue spectral range of above 80%, having the advantage that only a minimum quantity of the expensive Teflon® AF material is necessary.

EXAMPLE 4

A liquid lightguide of a ⌀5×1,500 mm Teflon® FEP tubing internally coated with a $3\mu$ thick layer of the TFE/PMVE copolymer is filled with a solution of CaCl$_2$ in H$_2$O with (n=1.435) and provides a transmission of 80% in the blue spectral range. When the coating is made of Teflon® AF, the lightguide provides a transmission of 84%, which is only insignificantly higher. Without any coating layer, this lightguide provides a transmission of 71%, i.e. the layer consisting of TFE/PMVE (with a 40% content) provides excellent transmission values even without the addition of PFPE.

What is claimed is:

1. A lightguide having a liquid core and a tubular cladding made from a plastic material, wherein:
   the tubular cladding has an inner surface;
   the inner surface of the tubular cladding is coated with a layer comprising a copolymer consisting of one of TFE and HFP; TFE and PMVE; or TFE and PPVE;
   HFP, PMVE or PPVE in said copolymer is present in an amount of from 25% to 50% by weight; and
   the tubular cladding consists of a fluorine containing polymer material selected from the group consisting of the materials fluorinated ethylene propylene (FEP), polytetrafluoroethylene (PTFE), perfluoroalkoxy (PFA), THV and perfluoroalkoxy (MFA).

2. The lightguide of claim 1, wherein the layer consisting of said copolymer has been deposited from a solution of said copolymer in a highly fluorinated cycloalkane or aromatic solvent.

3. The lightguide of claim 1, characterized in that the thickness of the layer is in the range of between 2 and 8$\mu$.

4. The lightguide of claim 1, characterized in that the layer, besides containing said copolymer TFE/HFP, TFE/PMVE, or TFE/PPVE respectively, additionally contains a perfluorated liquid having a boiling point of higher than 200° C. and a refractive index of lower than 1.31.

5. The lightguide of claim 1 and 4, characterized in that the perfluorated liquid is contained in said copolymer of said layer in an amount of between 0.5 and 100 percent by weight.

6. The lightguide of claim 4, characterized in that the perfluorated liquid is a perfluoropolyether.

7. The lightguide of claim 6, characterized in that the perfluoropolyether is one of perfluoropolymer, perfluoropolyethers, or hexafluroropropylene expoxide polymers, or contains a mixture of said substances.

8. The lightguide of claim 1, characterized in that said layer is formed of two layers 1 and 2, layer 1 containing copolymer TFE/HFP or TFE/PMVE or TFE/PPVE, and layer 2 containing copolymer PDD/TFE.

9. The lightguide of claim 1, characterized in that the thickness of the layer is between 1 and 10$\mu$.

10. The lightguide of claim 1, characterized in that the thickness of the layer is between 2 and 6$\mu$.

11. The lightguide of claim 1, characterized in that the liquid core of the lightguide contains an aqueous salt solution selected from the group of chlorides or phosphates, or a water miscible liquid.

12. The lightguide of claim 1, characterized in that the liquid core contains an aqueous solution consisting of CaCl$_2$ dissolved in H$_2$O or D$_2$O, NaH$_2$PO$_4$ dissolved in H$_2$O or K$_2$HPO$_4$ dissolved in H$_2$O, or triethyleneglycol or dimethylsulfoxide admixed with H$_2$O or D$_2$O.

* * * * *